(12) United States Patent
Kaiser et al.

(10) Patent No.: US 7,631,023 B1
(45) Date of Patent: Dec. 8, 2009

(54) PERFORMANCE-ADJUSTED DATA ALLOCATION IN A MULTI-DEVICE FILE SYSTEM

(75) Inventors: Scott D. Kaiser, Belmont, CA (US); Par Botes, Mountain View, CA (US); Oleg Kiselev, Palo Alto, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1148 days.

(21) Appl. No.: 10/997,594

(22) Filed: Nov. 24, 2004

(51) Int. Cl.
*G06F 17/30* (2006.01)

(52) U.S. Cl. .................. 707/205; 707/204; 711/114; 711/170

(58) Field of Classification Search ......... 707/200–205; 714/42; 711/100–114, 170, 161–162
See application file for complete search history.

(56) References Cited

U.S. PATENT DOCUMENTS

| | | | |
|---|---|---|---|
| 6,880,102 B1 * | 4/2005 | Bridge | 714/6 |
| 7,096,336 B2 * | 8/2006 | Furuhashi et al. | 711/165 |
| 7,124,247 B2 * | 10/2006 | Korgaonkar | 711/114 |
| 7,392,365 B2 * | 6/2008 | Selkirk et al. | 711/202 |
| 7,454,446 B2 * | 11/2008 | Leung et al. | 707/205 |
| 2003/0104788 A1 * | 6/2003 | Kim | 455/67.3 |

OTHER PUBLICATIONS

"Advanced File System and Utilities for Digital Unix," Digital Equipment Corporation, 1996, (36 pages).
"IRIX Admin: Disks and Filesystems," http://techpubs.sgi.com/library/tpl/cgi-bin/summary.cgi?coll=0650&db=bks &docnumber=007-2825-012, Jul. 29, 2003, (4 pages).
"Sun QFS, Sun SAM-FS, and Sun SAM-QFS File System Administrator's Guide," Sun Microsystems, Inc., Aug. 2002.

* cited by examiner

*Primary Examiner*—Debbie M Le
(74) *Attorney, Agent, or Firm*—Robert C. Kowert; Meyertons, Hood, Kivlin, Kowert & Goetzel, P.C.

(57) ABSTRACT

A file system may employ an enhanced or performance-adjusted allocation scheme when storing data to multiple storage devices. A file system may monitor one or more performance characteristics of storage devices. The file system may, in response to storage requests, select one or more of the storage devices for storing data associated storage requests based on differences among the respective monitored performance characteristics for the storage devices. Additionally, the file system may determine an allocation pattern for storing data to the storage devices and may modify the determined allocation pattern based on a detected change in the monitored performance characteristics of the storage devices. Further, the file system may store data based on both the allocation pattern and on data characteristics associated with a data storage request. The file system may also incorporate input specifying either new performance characteristics or a new allocation pattern.

25 Claims, 11 Drawing Sheets receive input specifying performance characteristics
for one or more of the storage devices
900 modify the allocation pattern based on the received
input
920 receive input specifying a new allocation pattern for storing data to the plurality of storage devices
1000 replace the determined allocation pattern with the new allocation pattern
1020

*FIG. 10*

PERFORMANCE-ADJUSTED DATA ALLOCATION IN A MULTI-DEVICE FILE SYSTEM

BACKGROUND OF THE INVENTION

1. Field of the Invention

This invention relates to data storage in general and, more particularly, to performance-adjusted data allocation in a multi-device file system.

2. Description of the Related Art

Modern distributed storage environments may include multiple storage objects connected via one or more interconnection networks. The interconnection networks provide the infrastructure to connect the various elements of a distributed storage environment. Traditionally, file systems store data to a single device. Storing data to different devices may help to ensure better load balancing, faster response time, and greater aggregated bandwidth, among other things. As the number of storage devices grows, the complexity of the entire storage environment grows dramatically. A file system may allocate data to a storage sub-system without determining or specifying how that data should be allocated across multiple storage devices. In other words, the storage sub-system itself will generally determine the specific storage device on which data should be stored. When determining how to allocate data storage, rather than simply writing data to one device until it becomes full and then moving on to another device, a storage sub-system may alternately store data to first one device then another. For instance, a storage sub-system may employ a simple, round robin data allocation policy, storing data to each device in turn. Alternatively, a storage sub-system may randomly choose the particular device on which to store data or stripe data according to a RAID algorithm. Generally, however, such device-level data allocation occurs without the file system's knowledge or involvement. In addition to storage devices, distributed storage environments frequently include other network elements, such as switches, hubs, and routers. Networking issues, such as path redundancy, load balancing across multiple network paths, and the number of network hops, may influence characteristics of the storage environment, such as access time, throughput, etc.

SUMMARY

According to various embodiments of the current invention, a file system may employ an enhanced, or performance-adjusted data allocation scheme when storing data to multiple storage devices in a multi-device file system. A multi-device file system may, in certain embodiments, be configured to virtualize data stored on multiple storage devices into a single, logical file system for application access. In some embodiments, a file system may monitor, at the file system level, one or more performance characteristics of a plurality of storage devices of a multi-device file system. For example, according to one embodiment, a file system may monitor such characteristics of storage devices as access time, response time, failure rate, recovery status, and/or throughput, among others. In certain embodiments, a file system may be configured to monitor differences in performance characteristics between data reads and data writes on the same storage device.

In response to file system storage requests, a file system may, in some embodiments, rather than apply a simple, round robin data allocation scheme, select one or more storage devices for storing data associated with each of the storage requests based on differences among the monitored performance characteristics for the storage devices. For instance, a file system may detect, based on monitored performance characteristics of three storage devices, that one storage device has a slower response time than the other two storage devices. For example, one storage device may be starting to fail, or perhaps may be performing a backup, or may be scanning for viruses. In such an example, according to one embodiment, a file system may allocate more data to the better performing storage devices than to the poorer performing device.

Additionally, in some embodiments, the file system may determine an allocation pattern for storing data to the storage devices and may modify the determined allocation pattern based on a detected change in the monitored performance characteristics of the storage devices. Further, the file system may store data based on both the allocation pattern and on data characteristics associated with a data storage request. For example, the file system may allocate storage requests involving smaller amounts of data to a storage device whose monitored performance characteristics reveal that it has a fast access time, but low overall throughput. Thus, by using both data characteristics regarding data storage requests and monitored performance characteristics, a file system may, according to various embodiments, allocate data intelligently to a plurality of storage devices. It is important to note that instead of making these types of data allocation decisions at a device or storage subsystem level, a file system may apply performance-adjusted data allocation decisions at the file system level.

The file system may also incorporate input specifying either new performance characteristics or a new allocation pattern, in some embodiments. For example, a file system may be configured to receive input specifying either an allocation pattern or specifying performance characteristics for one or more storage devices. Thus, in certain embodiments, a system administrator or other user may be able to adjust or tune the allocation of data in such a multi-device file system.

BRIEF DESCRIPTION OF THE DRAWINGS

FIG. 10 is a flowchart illustrating a method for replacing a determined data allocation pattern with an input allocation pattern, according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
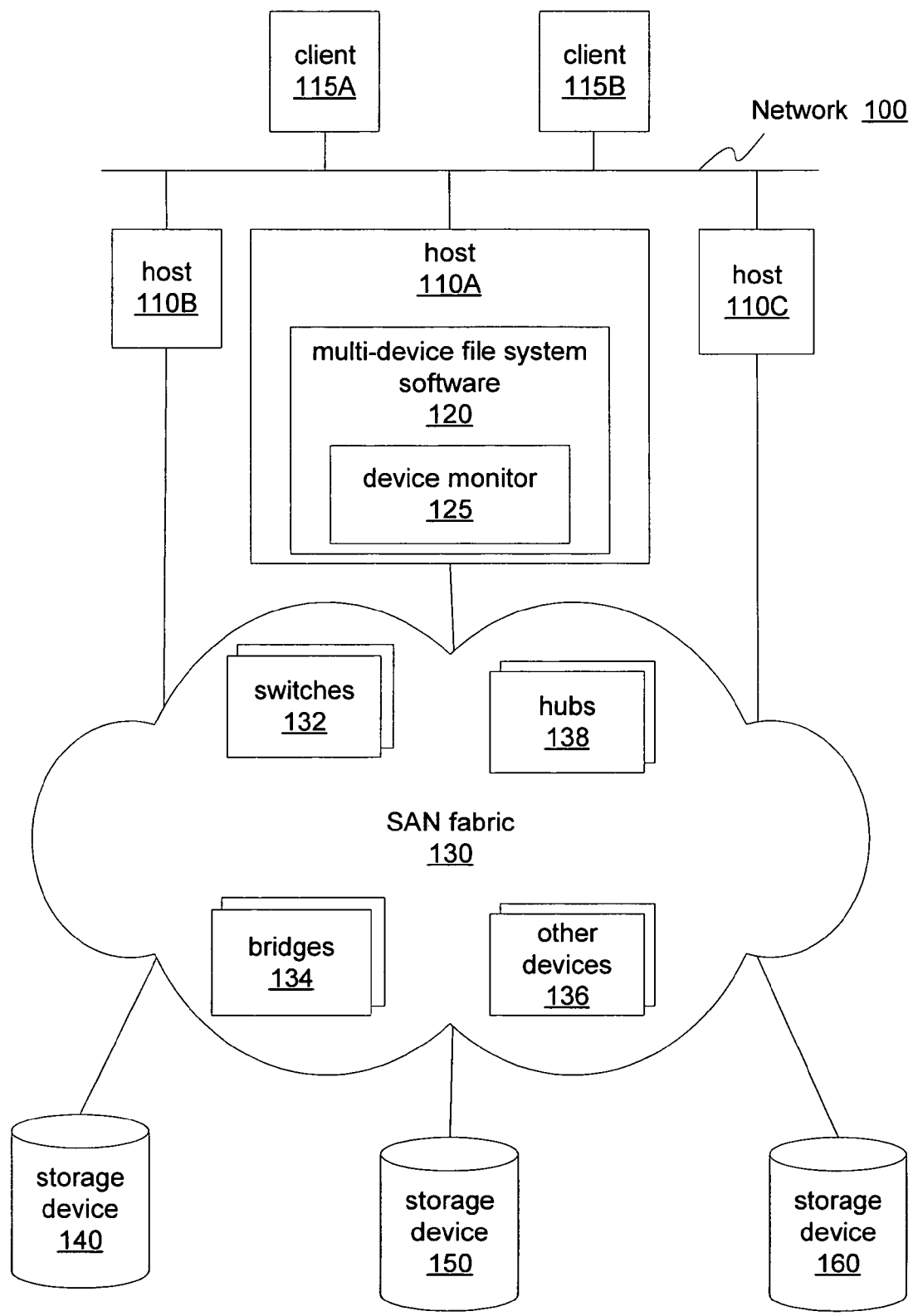
FIG. 1 is a block diagram illustrating, according to one embodiment, a multi-device file system capable of implementing performance-adjusted data allocation as described herein.

FIG. 1 is a block diagram illustrating, according to one embodiment, a multi-device file systems capable of implement performance-adjusted data allocation as described herein. FIG. 1 illustrates a computer network, according to certain embodiments, in which multi-device file system software, executing on a host device, may be configured to apply performance-adjusted data allocation when storing data to multiple storage devices. File system software for a multi-device file system may present data in a unified manner as if the data resides on a single storage device even though the file system may utilize multiple storage devices that each may also include multiple storage devices. Data in a multi-device file system may be stored on a number of individual storage devices that may make up a single, virtual, unified data device or volume presented to client applications. In some embodiments, a device may be a logical device or volume such that a multi-device file system may comprise multiple data volumes and therefore may be a multi-volume file system. Thus, performance-adjusted data allocation as described herein may also apply to a multi-volume file system.

When applying performance adjusted data allocation, multi-device file system software may monitor, at a file system level, one or more performance characteristics of a plurality of storage devices to determine how data should be allocated among the storage devices, according to various embodiments. In one embodiment, the multi-device file system software may directly monitor performance characteristics, while in another embodiment, the file system software may receive such information from a monitor external to the file system, such as a monitor on a different host device. Multi-device file system software may, according to various embodiments, monitor the aggregate performance characteristics of storage devices even when those storage devices are storage sub-systems that themselves may include multiple storage devices. Thus, multi-device file system software may be able to determine where to allocate data among multiple storage devices based on the total performance characteristics of each storage device as a storage sub-system, in various embodiments. In one embodiment for instance, multi-device file system software, such as multi-device file system software 120, executing on host 110A, may be configured to store data to storage devices 140, 150, and 160. File system software 120 may, in some embodiments, monitor performance characteristics of storage devices 140, 150, and 160 to select a specific device to storage data to in response to a data storage request. In some embodiments, multi-device file system software may be configured to determine a storage device to store data on in response to receiving a data allocation request. According to various embodiments, a data storage request may be associated with either a data allocation request, a data write request, or both, and in general, the terms "data storage request" and "data allocation request" may be used interchangeably herein.

FIG. 1 also illustrates an exemplary network system capable of implementing embodiments of performance-adjusted data allocation, according to certain embodiment. Specifically, FIG. 1 illustrates a SAN or Storage Attached Network. A SAN system is just one of numerous possible embodiments of storage and file systems capable of monitoring performance characteristics of storage devices and of applying performance-adjusted data allocation, as described herein. A SAN may be a high-speed network that enables fast, reliable access among host/servers 110 (A, B and C), and storage devices 140, 150, and 160. A SAN may connect servers to storage devices, servers to each other, and/or storage devices to other storage devices through combinations of hubs, switches, bridges, and/or other devices collectively referred to as a SAN Fabric. For instance, in one embodiment as illustrated by FIG. 1, SAN fabric 130 may connect hosts 110, with storage devices 140, 150, and 160 using a combination of hubs 138, switches 132, bridges 134, and/or other devices 136.

A SAN may include a number of SAN fabric components, such as switches, hubs, bridges, or other devices, that perform various functions within the SAN system and depending on the number of host/servers and storage devices that the SAN will interface. For example, hub 138 may perform a repeater function, which is to amplify and/or regenerate a received signal and provide it at multiple outputs. A hub takes the data that comes into one port and sends it out all other ports that are included in the hub. It doesn't usually perform any filtering or redirection of data. Bridges 134 are useful for joining networks made of different media types or protocols together into larger networks, and keeping network segments free of data that doesn't belong in a particular segment. Bridges 134 may join networks or network segments, which use different protocols. In such cases, the bridge may perform lower layer translation on the packets that it transfers from one network to another. In some embodiments, the SAN may include only a subset of the types of SAN fabric components.

One or more end-user platforms (clients 115) may access the SAN, typically via a LAN or WAN connection to one or more of the hosts 110 to access data stored on storage devices 140, 150, and 160. Storage devices 140, 150, and 160 may include, but are not limited to, one or more of RAID (Redundant Array of Independent Disks) systems, disk arrays, JBODs (Just a Bunch Of Disks, used to refer to disks that are not configured according to RAID), tape devices, and optical storage devices. While storage devices 14, 150, and 160 may, in some embodiments, represent single devices, in other embodiments, each storage device depicted in FIG. 1 may represent multiple individual storage devices configured so as to be accessed as a single storage unit. For instance, in one embodiment storage device 150 may represent a RAID system including to or more individual storage devices. In some embodiments, a file system may include two or more different types of storage systems. For example, storage device 140 may represent a single disk drive while storage device 150 may represent RAID storage system and storage device 160 may represent a tape device. In general, a multi-device file system may utilize performance-adjusted data allocation regardless of the underlying storage subsystem, according to various embodiments.

Normally, an enterprise's data may be stored on disk drive type storage devices to provide fast access time. Generally, clients of a file system access data through a host or file server of the file system. Host/servers 110, may be any of various types of devices, including, but not limited to, personal computer systems, desktop computers, laptop or notebook computers, mainframe computer systems, workstations, network appliances, network computers, Internet appliances, or other suitable devices. Host 110A may include at least one processor. The processor may be coupled to memory. Memory is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

SANs and other multi-device file systems, may be implemented using a wide variety of technologies. The SAN mix can include Enterprise Systems Connection (ESCON), Fiber Distributed Data Interface (FDDI), Asynchronous Transfer Mode (ATM), IBM's Serial Storage Architecture (SSA), and Fibre Channel. SAN architectures may also implement a number of underlying protocols, including TCP/IP and variants of SCSI (Small Computer System Interface). The most popular implementation of SAN for open systems is based on SCSI over Fibre channel. Fibre Channel Protocol (FCP) specifies how to run the SCSI command set over a dedicated Fibre Channel optical fabric. In direct server attached storage, a local SCSI controller on a peripheral bus fulfills a data request initiated by a SCSI driver in the host server. On a SAN, a Fibre Channel host bus adapter (HBA) may replace the SCSI controller in each server 120 to connect to the SAN fabric 130, which in turn may connect to disk arrays, tape drives, and other storage devices.

A LUN (logical unit number) is the SCSI identifier of a logical unit within a target, the system component that receives a SCSI I/O command. A logical unit is an entity within a SCSI target that executes I/O commands. SCSI I/O commands are sent to a target and executed by a logical unit within that target. A SCSI physical disk typically has a single logical unit. Tape devices and array controllers may incorporate multiple logical units to which I/O commands may be addressed. Each logical unit exported by an array controller may correspond to a virtual disk. SAN fabric 130 may be implemented, for example, in accordance with the Fibre Channel Switch Fabric-2 (FC-SW2) open standard specification to provide redundancy and ensure high data availability. SANs may be deployed in both homogeneous and heterogeneous environments. In a heterogeneous environment, a SAN may allow different kinds of servers, e.g. Windows NT, UNIX, Linux, Netware, and OS/390, to share different kinds of storage, e.g. disk, tape, and redundant arrays of inexpensive disks (RAID). With this shared capacity, organizations may be able to acquire, deploy, and use storage devices more cost-effectively.

Network 100, as illustrated in FIG. 1, may comprise any of various network technologies according to various embodiments. Network 100 may be a local area network, wide area network, intranet network, Internet network, or many other types of network. Network 100 may be designed to be continuously available (although network outages may occur), or may be intermittent (e.g. a modem connection made between a computer system in a user's home and a computer system in a user's workplace). Network 100 may utilize any of a number of different physical networking technologies including, but not limited to, Fiber Channel, Ethernet, Fast-Ethernet, Gigabit-Ethernet, Myrinet, Infiniband, VAX CI, or Server-Net, or others. Network 100 may be configured according to a number of different network topologies including, but not limited to, star, token-ring, token-bus, scatternet, dual-ring, mesh, etc. Network 100 may also be configured to utilize a combination of different networking technologies and/or topologies. Additionally, Network 100 may comprise shared storage or shared memory for communicating between different computer systems or between processes within the same computer system, according to some embodiments. In some embodiments, Network 100 may be the interconnect network for any of various distributed shared storage environments, including, but not limited to, network file system (NFS), common Internet file system (CIFS), storage area network (SAN), network attached storage (NAS), storage-network aggregation, multi-site block storage, object-based storage devices (OBSD), or other asymmetric, out-of-band, or shared storage models.

A storage device, such as storage device 140, 150, or 160, may include any type of networkable computing device capable communicating with and providing data storage services for other devices or processes in a distributed shared storage environment. According to various embodiments, storage devices 140, 150, and 160, may be configured to implement any of numerous data storage models including but not limited to, storage-network attach, storage-network aggregation (SNA), network attached storage (NAS), storage area network (SAN), Redundant Array of Independent (or Inexpensive) Disks (RAID), or as object-based storage devices (OBSDs). In certain embodiments, storage devices may be configured to implement a combination of different data storage models. Storage devices may utilize one or more of numerous types of storage media including but not limited to Hard disk storage, floppy disk storage, removable disk storage, flash memory and random access memory (RAM) are examples of storage media. The terms "storage" and "storage medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The storage medium may include other types of storage as well, or combinations thereof.

According to various embodiments of the current invention, a file system may employ an enhanced, or performance-adjusted data allocation scheme when storing data to multiple storage devices in a multi-device file system. A multi-device file system may, in certain embodiments, be configured to virtualize data stored on the storage devices into a single, logical file system for application access. In certain embodiments, the devices to which a multi-device file system allocates or stores data may include multiple volumes instead of, or in addition to, individual storage devices or LUNs. In such embodiments, a volume manager may aggregate, for data availability and reliability, data on multiple storage devices and present it to the file system as a single, integral virtual disk device. Thus, multi-volume, multi-device, and multi-LUN can be used interchangeably herein. In some embodiments, a file system may monitor at the file system level one or more performance characteristics of a plurality of storage devices of a multi-device file system. For example, according to one embodiment a file system may monitor such characteristics of storage devices as access time, response time, failure rate, recovery status, throughput, longevity, or sharing characteristics, among others. In some embodiments, a file system may monitor the differences in performance characteristics between data reads and data writes to the same device. Storage devices may exhibit different performance characteristics for different reasons, according to various embodiments. For example, one storage device may be configured to optimize the storing of small random block operations, while another storage device may be configured to optimize the storing of steaming I/O data. As illustrated in FIG. 1, according to one embodiment, multi-device file system software, such as multi-device file system software 120 may include a device monitor, such as device monitor 125, that is configured to monitor performance characteristics of storage devices, such as storage devices 140, 150, and 160. In other embodiments, however, file system software 120 may monitor storage devices without utilizing a special device monitor, such device monitor 125.

In some embodiments, file system software may utilize an external device monitor and may receive monitored performance characteristics that the device monitor collected. For instance, file system software 120 may utilize a device monitor on host 110C or may use a device monitor on another network fabric device. Additionally, in certain embodiments, device monitor 125 may reside on the same device as multi-device file system software 120, but not be a part of file system software 120. When using an external device monitor, file system software 120 may be configured to receive monitored performance characteristics from the external device monitor in any of various manners, such as through an API exposed either by file system software 120 or the external device monitor. In one embodiment, file system software 120, or device manager 125, may exhaustively monitor performance characteristics for every I/O to every storage device, while, in other embodiments, file system software 120 may only periodically monitor performance characteristics for storage devices. In general, the frequency or method with which file system software monitors performance characteristics of storage devices may vary from embodiment to embodiment.

In response to file system storage requests, a file system may, in some embodiments, rather than apply a simple, round robin data allocation scheme, select one or more storage devices for storing data associated with each of the storage requests based on differences among the monitored performance characteristics for the storage devices. For instance, a file system may detect, based on monitored performance characteristics of three storage devices, that one storage device has a slower response time than the other two storage devices. For example, one storage device may be starting to fail, or perhaps may be performing a backup, or may be scanning for viruses. In such an example, according to one embodiment, a file system may allocate more data to the better performing storage devices than to the poorer performing device. Additionally, in some embodiments, a file system, such as multi-device file system software 120, may monitor differences in performance characteristics between the data reads and data writes to a single storage device. For example, one storage device may be faster as performing writes then reads, while another storage device may be the opposite, having faster reads than writes. In other embodiments, a file system may use a round robin data allocation scheme as a default when there are no significant differences in the monitored performance characteristics, and may alter than data allocation scheme when differences in the monitored performance characteristics occur.

As noted above, in some embodiments, multi-device file system software 120 may receive data allocation requests and may determine a storage device on which to allocate data associated with a data allocation request. For example, in one embodiment, multi-device file system software 120 may receive a data allocation request and may determine, based upon monitored performance characteristics, a storage device on which to allocate data associated with the received data allocation request. In such an example, future data storage requests associated with the data allocation request, such as data write requests for the same file as indicated by the data allocation request, may be directed to the storage device selected in response to receiving the data allocation request. In other words, data may be allocated on a particular storage device based upon a determination made in response to an allocation request received earlier, according to some embodiments. Thus, in certain embodiments, a multi-device file system may receive data storage requests and may not actually determine a storage device for that particular storage request, but instead may allocate all the data associated with a single data allocation request to a single storage device.

Additionally, in some embodiments, the file system may determine an allocation pattern for storing data to the storage devices and may modify the determined allocation pattern based on a detected change in the monitored performance characteristics of the storage devices. For example, a file system may monitor three storage devices A, B, and C, and determine that storage device A performs worse than devices B or C. In such an example, according to one embodiment, the file system may determine a data allocation pattern for the three storage devices that allocates more data to devices B and C and to A. Such a pattern may be represented as: ABCBCABCBC, where data is allocated to storage devices B and C twice as often as data is allocated to device A. In another embodiment, the file system may detect a change in the monitored performance characteristics for the storage devices. For instance, perhaps device B is begins performing worse than device C. In one embodiment, the file system may then modify the data allocation pattern in order to reduce the amount of data allocated to the device B. The modified allocation pattern may be represented as: ABCCABCC, indicating that data is allocated to device C twice as often as it is allocated to either device A or B.

Further, the file system may store data based on both the allocation pattern and on data characteristics associated with a data storage request. For example, the file system may allocate storage requests involving smaller amounts of data to a storage device whose monitored performance characteristics reveal that it has a fast access time, but low overall throughput. Thus, by using both data characteristics regarding data storage requests and monitored performance characteristics, a file system may, according to various embodiments, allocation data intelligently to a plurality of storage devices.

The file system may also incorporate input specifying either new performance characteristics or a new allocation pattern, in some embodiments. For example, a file system may be configured to receive input specifying either an allocation pattern or specifying performance characteristics for one or more storage devices. Thus, in certain embodiments, a system administrator or other user may be able to adjust the allocation of data in such a multi-device file system.

Figure 2:
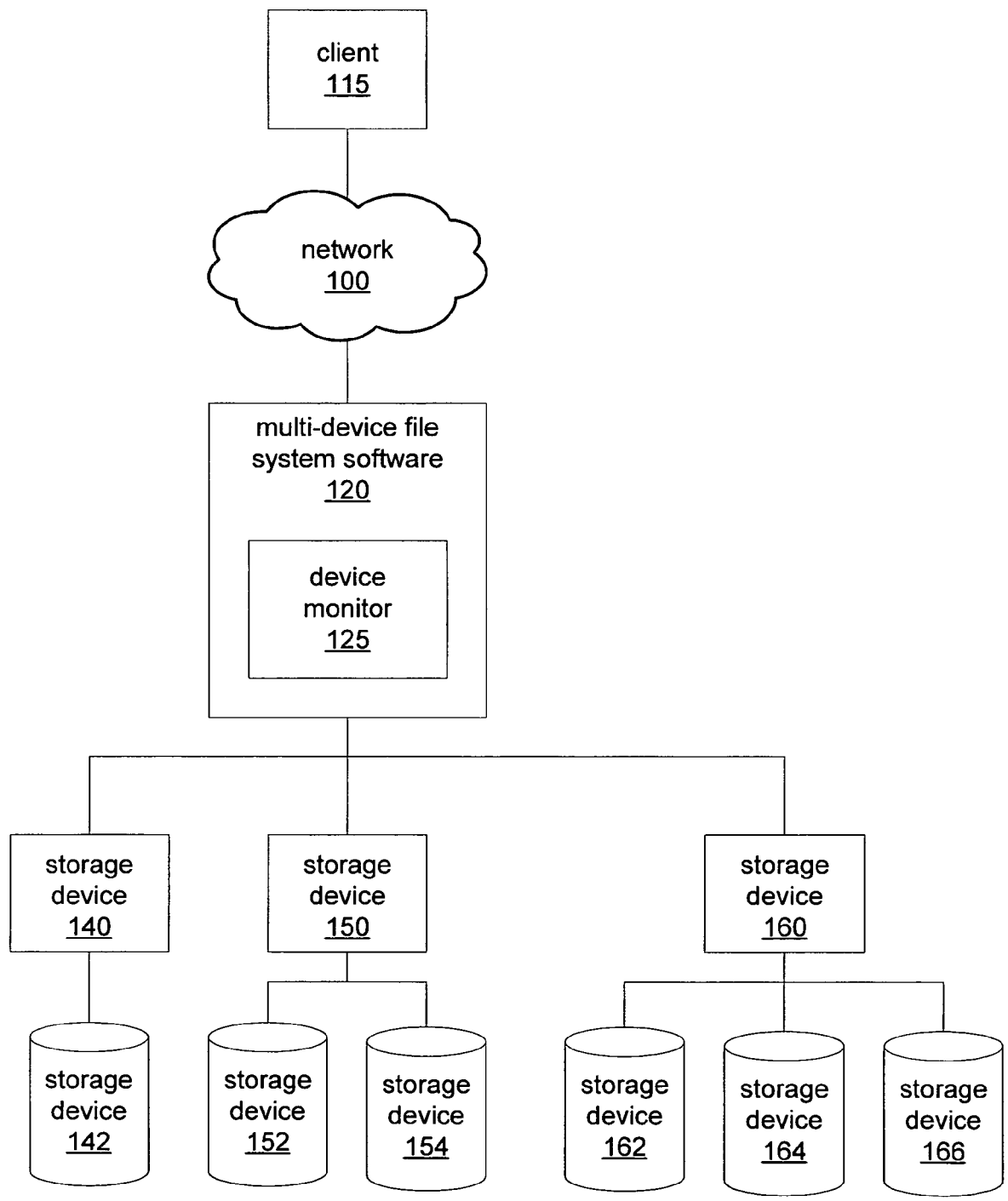
FIG. 2 is a block diagram illustrating a multi-device file system configured to monitor performance characteristics of storage devices, in one embodiment.

FIG. 2 is a block diagram illustrating a multi-device file system configured to monitor performance characteristics of storage devices, in one embodiment. According to various embodiments, a multi-device file system may monitor performance characteristics of storage devices when implementing performance-adjusted data allocation to the storage devices. In certain embodiments, multi-device file system software, such as multi-device file system software 120 may include a device monitor, such as device monitor 125, that may be configured to monitor multiple storage devices. In certain embodiments, device monitor 125 may monitor performance characteristics, such as access time, response time, failure rate, recovery status, or throughput, among other things, for multiple storage devices, such as storage devices 140, 150, and 160, as illustrated in FIGS. 1, and 2. A storage device in a multi-device file system may include more than one storage device. For example, according to one embodiment, storage device 140 may include a single storage device 142, while storage device 150 may include two storage devices 152 and 154, and storage device 160 may include three storage devices 162, 164, 166. In general, the number of storage devices included in storage devices may vary from embodiment to embodiment while still implementing performance-adjusted data allocation to those storage devices, as described herein.

In one embodiment, multi-device file system 120 may receive a data storage request from client 115 across network 100 and may apply performance-adjusted data allocation based on the performance characteristics for storage devices 140, 150 and 160 as monitored by device monitor 125. For example, based on the monitored performance characteristics, multi-device file system software 120 may select one storage device to which to store the data associated with the storage request received from client 115, in one embodiment. When selecting which storage device to which to write the data, multi-device file system software 120 may take into account to which storage device the data associated with a previous storage request was written. For instance, the data for a first data storage request may be written to storage device 140, while the data for a next storage request may be written to storage device 160, based upon the performance characteristics monitored by device manager 125, according to one embodiment.

As described above, device monitor 125 may monitor performance characteristics for every I/O to every storage device, or may alternately only monitor performance characteristics periodically, according to various embodiments.

Figure 3:
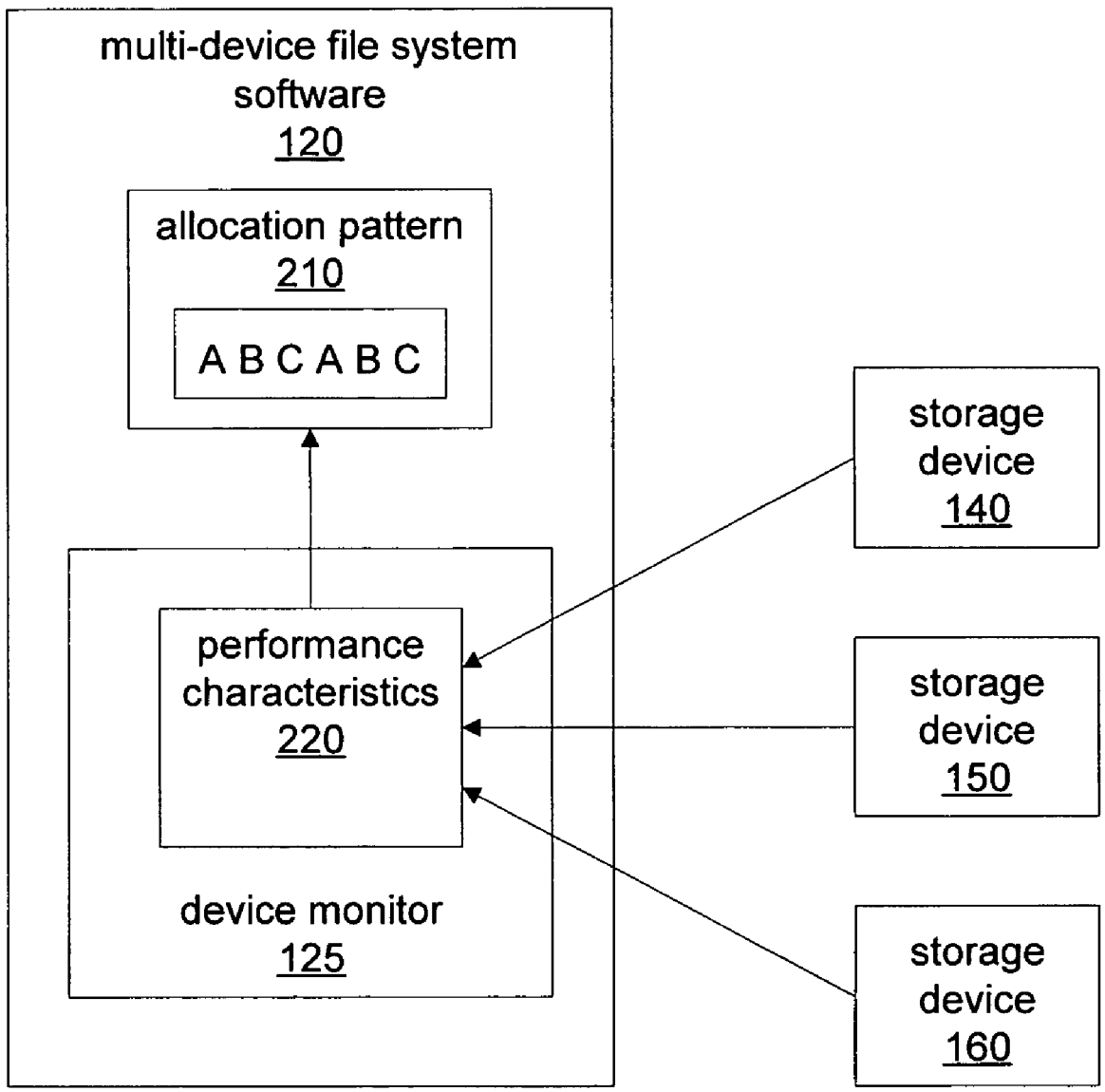
FIG. 3 is a block diagram illustrating, according to one embodiment, a multi-device file system determining a data allocation pattern based on monitored performance characteristics of storage devices.

FIG. 3 is a block diagram illustrating, according to one embodiment, a multi-device file system determining a data allocation pattern based on monitored performance characteristics of storage devices. In some embodiments, multi-device file system software, such as multi-device file system software 120, may be configured to determine and possibly maintain an allocation pattern for storing data to a plurality of storage devices. For example, multi-device file system software 120 may configure device monitor 125 to monitor one or more performance characteristics for storage devices 140, 150 and 160, in one embodiment. In such an example, multi-device file system software 120 may use performance characteristics 220 to determine allocation pattern 210, according to one embodiment.

While FIG. 3 illustrates multi-device file system software 120 using a simple ABCABC allocation pattern, allocation patterns in other embodiments may be much more detailed and varied. For example, if, in one embodiment, performance characteristics 220 show that one storage device, say storage device 160, has a slower access time than either of the other two storage devices, multi-device system software 120 may determine allocation pattern that allocates data more often to storage devices 140 and 150 than it does to storage device 160. The specific performance characteristics monitored and used to determine an allocation pattern may vary from embodiment to embodiment. For example in one embodiment, device monitor may monitor access and response time, while in other embodiments device monitor may monitor overall through in addition or instead of access and response times.

Please note that while FIG. 3 illustrates allocation pattern 210 as a string of capital letters, each representing a storage device, other embodiments may represent and/or store an allocation pattern in many different manners. For instance, in one embodiment, multi-device file system software 120 may use an array of storage device identifiers, while in another embodiment multi-device file system software 120 may use a linked-list of pointers to storage device interfaces to maintain and use an allocation pattern. In general, any suitable method of representing and storing an order for storing data to a plurality of storage devices may be used to maintain an allocation pattern, in different embodiments.

Additionally, in some embodiments, allocation pattern 210 may represent an anticipated allocation pattern. In other words, multi-device file system software 120 may determine allocation pattern 210 based on how it expects to store data to the storage devices for upcoming, i.e. not yet received, storage requests. In other embodiments, however, allocation pattern 210 may represent how data was allocated in the past. In such an embodiment, multi-device file system software 120 may select which storage device to next allocate data to based on how data was stored recently and may update an allocation pattern based on the most recently stored data. Thus, in different embodiments, allocation pattern 210 may represent an allocation plan, while, in other embodiments, allocation pattern may represent an allocation history used to determine the next allocation.

Figure 4:
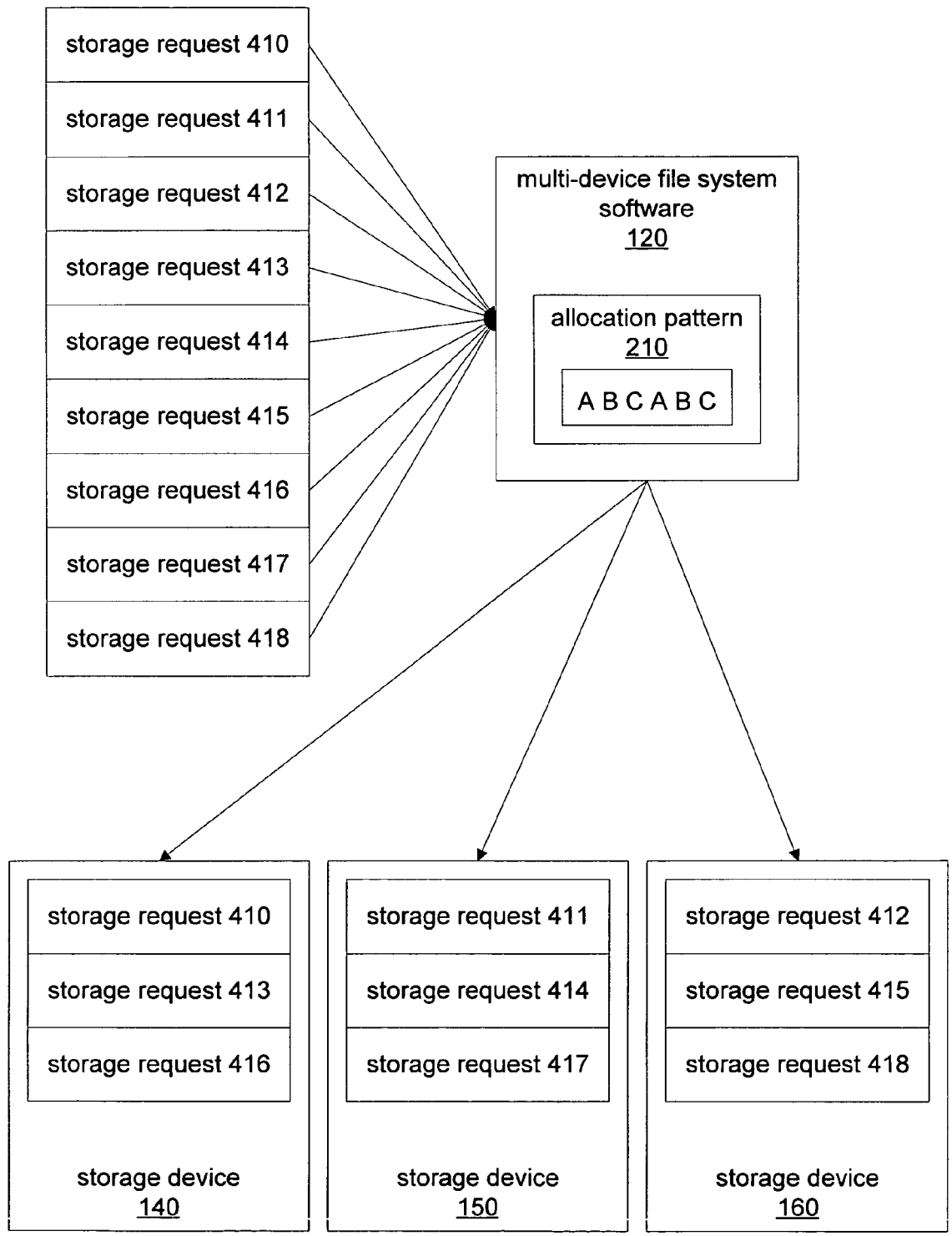
FIG. 4 is a block diagram illustrating a multi-device file system storing data to storage devices based on a determined allocation pattern, according one embodiment.

FIG. 4 is a block diagram illustrating a multi-device file system storing data to storage devices based on a determined allocation pattern, according one embodiment. For example, multi-device file system 120 may have previously monitored performance characteristics for storage devices 140, 150 and 160, as described above regarding FIG. 2. In such an example, multi-device file system 120 also may have determined allocation pattern 210, which in the embodiment illustrated by FIG. 4 is a simple ABCABC pattern alternating among each of the storage devices in turn. As storage requests are received, multi-device file system 120 stores the data associated with each request to one of the storage devices according to allocation pattern 210, in some embodiments. Thus, the data associated with storage request 410 are stored on storage device 140, represented by an 'A' in allocation pattern 210. Similarly the data associated with storage requests 411 and 412 are stored on storage devices 150 and 160, represented by a 'B' and 'C' respectively in allocation pattern 210, in one embodiment. After storing data to storage device 160, the data associated with storage request 413 is written to storage device 140. This pattern may be continued indefinitely, as illustrated by storage requests 410 through 418 in FIG. 4, until the monitored performance characteristics cause multi-device file system software 120 to modify allocation pattern 210.

In certain embodiments, multi-device file system software 120 may store data associated with a single storage request to more than one storage device. For example, in one embodiment, multi-device file system software 120 may be configured to mirror data to more than one device.

Figure 5:
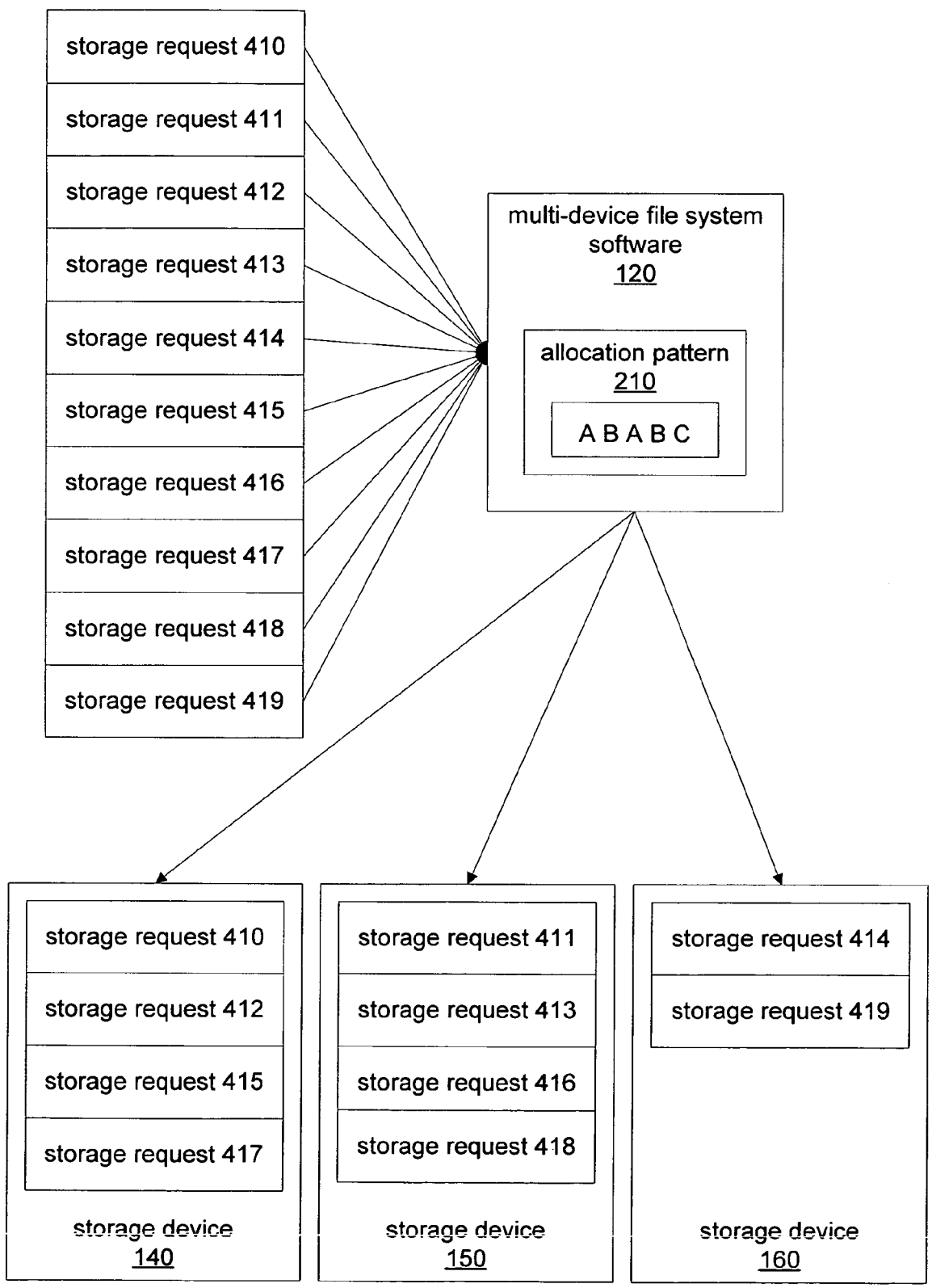
FIG. 5 is a block diagram illustrating, as in one embodiment, a multi-device file system storing data to storage devices based on a modified allocation pattern, in one embodiment.

FIG. 5 is a block diagram illustrating, as in one embodiment, a multi-device file system storing data to storage devices based on a modified allocation pattern, in one embodiment. Similarly to the discussion above regarding FIG. 4, according to the embodiment illustrated by FIG. 5, multi-device file system software 120 may store data associated with data storage requests to storage devices 140, 150, and 160 based on allocation pattern 210. In this example, however, multi-device file system software 120 may have modified allocation pattern 210 based on a detected change in monitored performance characteristics for one or more of the storage devices. For instance, storage device 160 may be starting to fail, resulting in poorer performance characteristics that the other storage devices. Alternatively, storage device 160 may be performing other tasks that result in poorer performance. For example, storage device 160 may be a RAID system and may be performing mirroring or otherwise rebuilding one of its underlying storage devices. In another example, device monitor 125 or multi-device file system software 120 may be notified of storage related events, such as a storage device or device beginning a recovery process or entering a recovery state, perhaps rebuilding a mirror or device. Regardless of the reason for storage device 160 performing more poorly than the other storage devices, multi-device file system software may detect the change in performance characteristics and modify allocation pattern 210 to allocate data more often to storage devices 140 and 150 than to storage device 160, according to some embodiments.

As illustrated by FIG. 5, in one embodiment, after modifying allocation pattern 210, multi-device file system software 120 may store data associated with received storage requests to storage devices 140, 150, and 160 according to modified allocation pattern 210. Multi-device file system software 120 may modify an allocation pattern based on changes in the performance characteristics for one or more storage devices. For example, in the embodiment illustrated by FIG. 5, multi-device file system software 120 may have detected a change in the performance characteristics for storage device 160. For instance, in one embodiment, storage device 160 may be beginning to fail and therefore is performing more slowly than the other storage devices, or in another device, storage device 160 may have less free storage space than the others. Alternatively, in another embodiment, storage device 160 may be performing an administrative task, such as backing up data or rebuilding a LUN. In some embodiments, the changes in performance may reflect a storage device performing better than previously.

As with the example described regarding FIG. 4 above, multi-device file system software 120 may store data associated with the first two storage requests, 410, and 411, to storage devices 140 and 150, respectfully. Data for the next storage request, storage request 412, are written to storage device 140, skipping storage device 160, according to this example and one embodiment. Data for storage request 413 are written to storage device 150 and data associated with storage 414 are written to storage device 160. Thus, according to one embodiment, data are allocated to storage devices 140 and 150 twice as often as to storage device 160.

Figure 6:
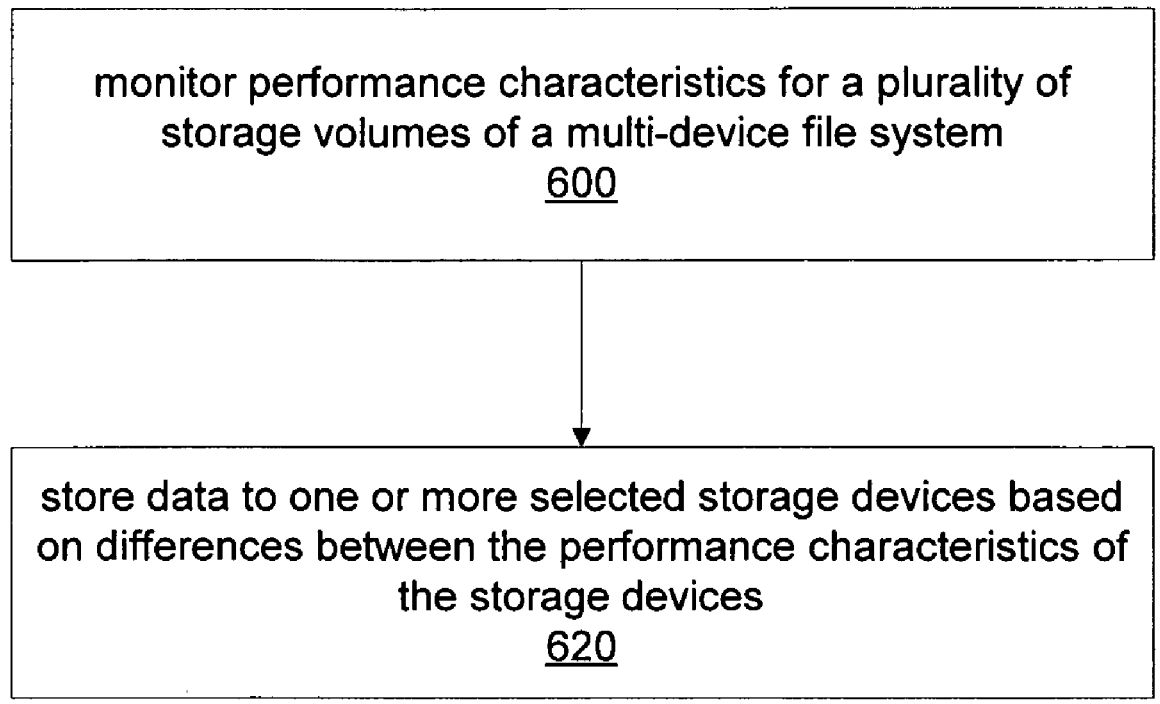
FIG. 6 is a flowchart illustrating one embodiment of a method for applying performance-adjusted data allocation to a multi-device file system.

FIG. 6 is a flowchart illustrating one embodiment of a method for applying performance-adjusted data allocation to a multi-device file system. As illustrated by block 600, multi-device file system software may monitor performance characteristics for a plurality of storage devices of a multi-device file system. For instance, multi-device file system software 120 may monitor various performance characteristics for storage devices 140, 150 and 160, in one embodiment. In another embodiment, multi-device file system software 120 may use a device-monitoring module, such as device monitor 210 to monitor the performance characteristics for the storage devices. Multi-device file system software 120 or device monitor 210 may monitor one or more of various types numbers of performance characteristics, such as access time, response time, failure rate, throughput, security, mirroring, replication, anticipated device end-of-life, free capacity, or storage class, among others, according to various embodiments. The exact number and type of the performance characteristics monitored by multi-device file system software 120 or device monitor 210 may vary from embodiment to embodiment.

In addition, multi-device file system software may store data to one or more selected storage devices based on differences between the performance characteristics of the storage devices, as illustrated by block 620. For example, multi-device file system software 120 may examine or other analyze the monitored performance characteristics to determine how the performance characteristics differ among the various storage devices and may, based on those differences, select which storage device to store data, according to various embodiments. In some embodiments, multi-device file system software 120 may examine the monitored performance characteristics to determine the differences among the storage devices for each received storage request, while in other embodiments, multi-device file system software 120 may only periodically determine the differences in monitored performance characteristics and use those determine differences for a number of received storage requests.

Figure 7:
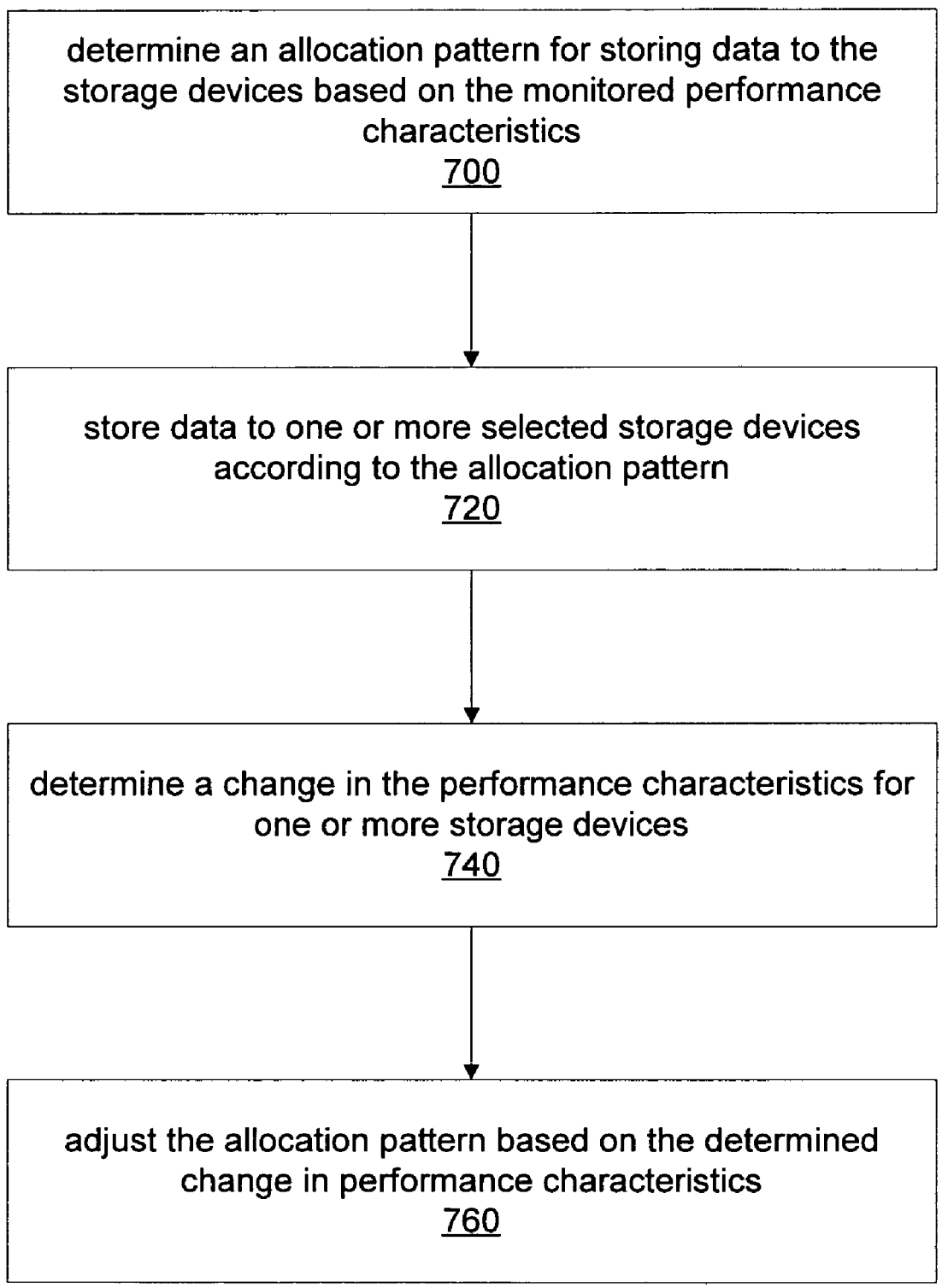
FIG. 7 is a flowchart illustrating a method for determining and modifying a data allocation pattern based on monitored performance characteristics of storage devices, according to one embodiment.

FIG. 7 is a flowchart illustrating a method for determining and modifying a data allocation pattern based on monitored performance characteristics of storage devices, according to one embodiment. As described above, multi-device file system software may, in some embodiments, determine an allocation pattern based on monitored performance characteristics and may modify or adjust such an allocation pattern based on changes in the monitored performance characteristics. As illustrated by block 700, multi-device file system software may determine an allocation pattern for storing data to storage devices based on monitored performance characteristics, according to one embodiment. For example, in one embodiment, multi-device file system software 120 may, after monitoring performance characteristics for storage devices 140, 150, and 160, determine allocation pattern 210 based on those performance characteristics. Additionally, multi-device file systems software may, in some embodiments, store data to one or more selected storage devices according to the allocation pattern, as illustrated by block 720.

Thus, multi-device file system software 120 may use allocation pattern 210 to select one or more storage devices to write data associated with received data storage requests. For instance, as described above regarding FIG. 4, multi-device file system software 120 may receive storage request 410 from client 115A and may, according to allocation pattern 210, select storage device 140 to store the data associated with storage request 410. Similarly, multi-device file system software 120 may later receive storage request 411 and may select storage device 150 based on allocation pattern 210.

Additionally, multi-device file system software may determine a change in the performance characteristics for one or more storage devices, as illustrated by block 740 and according to one embodiment. For instance, multi-device file system software 120 may continue to monitor performance characteristics for the storage devices, while storing data for received storage requests for example, and may based on newly monitored performance characteristics determine a change in the monitored performance characteristics for one or more of the storage devices. Perhaps one of the storage devices is exhibiting a slower access time, or perhaps one of the devices has started to perform a background task like backing up, scanning, or rebuilding the data on a mirrored device. Not all changes may be negative performance changes, however. For instance, a storage device that may have finished a background task, such as backing up data to a tape drive, and therefore multi-device file system software 120 may notice better performance characteristics for one or more of the storage devices. After determining a change in the monitored performance characteristics for one or more storage devices, multi-device file system software may, in one embodiment, adjust the allocation pattern based on the determined change in performance characteristics, as illustrated by block 760. Thus, multi-device file system software 120 may, use a determined change in performance characteristics to adjust or modify allocation pattern 210 and then may use the adjusted allocation pattern when selected storage devices for storing data associated with future storage requests.

Figure 8:
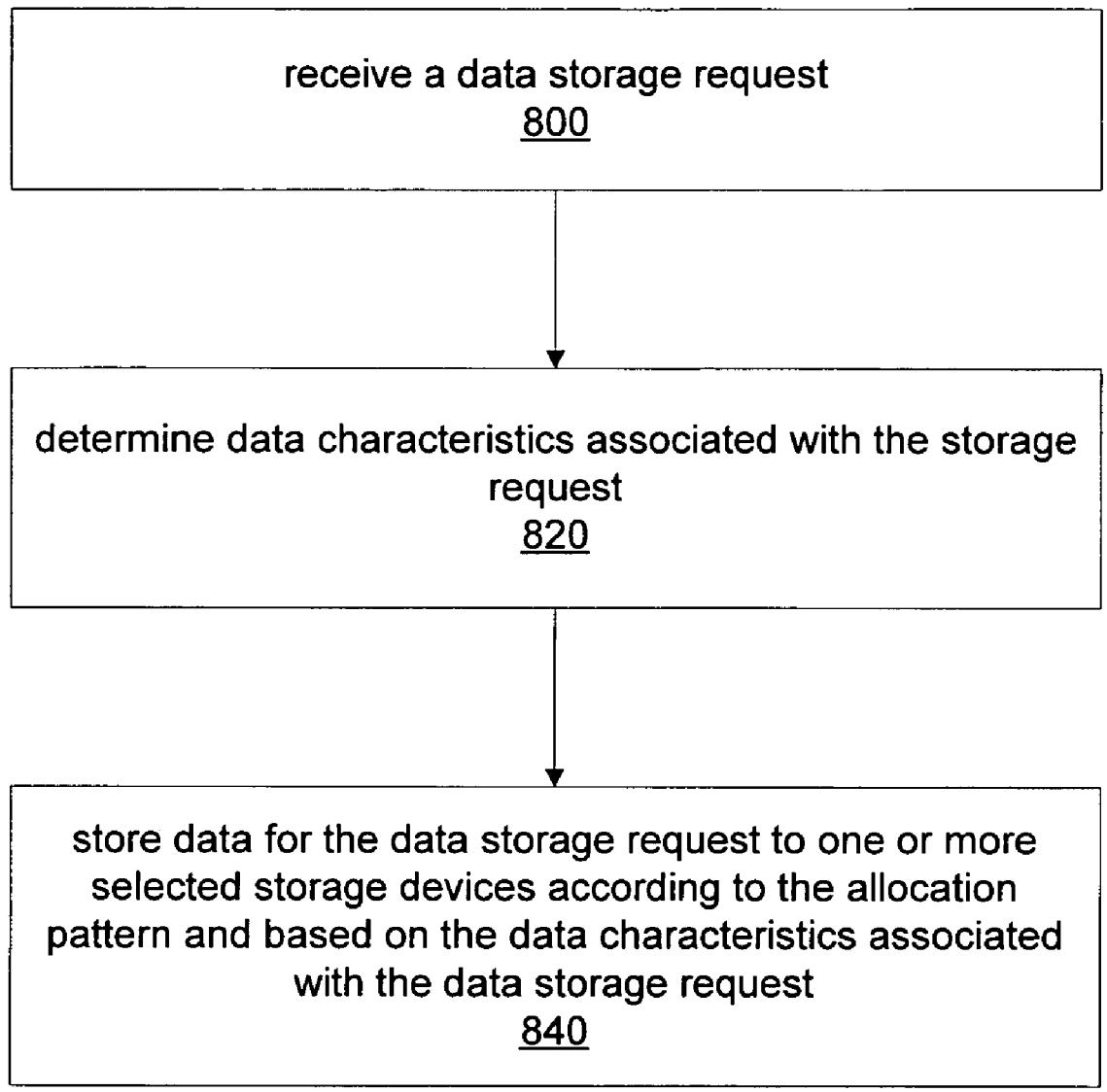
FIG. 8 is a flowchart illustrating one embodiment of a method for applying data characteristics to performance-adjusted data allocation in a multi-device file system.

FIG. 8 is a flowchart illustrating one embodiment of a method for applying data characteristics to performance-adjusted data allocation in a multi-device file system. Multi-device file system software may, according to one embodiment, receive a data storage request, as illustrated by block 800, and may determine data characteristics associated with the storage request, as illustrated by block 820. For example, multi-device file system software 120 may, in some embodiments, receive storage requests, such as storage request 410, and may determine characteristics about the data, such as data criticality, portability, or probability of future access, among others. Additionally, multi-device file system software 120 may determine metadata characteristics regarding the data associated with a storage request, in some embodiments. For instance, the metadata for a data storage request may indicate that data for a certain storage request is a temporary file that will most likely be deleted soon, and thus multi device file system software 120 may select a more poorly performing storage device for this data.

After determining data characteristics associated with a received storage request, multi-device file system software may, according to one embodiment, store data for the data storage request to one or more selected storage devices according to the allocation pattern and based on the data characteristics associated with the data storage request, as illustrated by block 840. For example, multi-device file system software 120 may, in one embodiment, select one or more storage devices, such as storage device 140, to store data associated with a data storage request based upon characteristics of the data and also based on an allocation pattern, such as allocation pattern 210. For instance, multi-device file system software 120 may determine that the data associated with a storage request has a both a low probability of future access and a low criticality, perhaps the data is backup data for a seldom used application and thus multi-device file system software 120 may select a storage device with poorer performance characteristics for storing this data.

Thus, rather than strictly following an allocation pattern in all cases, multi-device file system software may, in some embodiment, use both the allocation pattern and data characteristics to select the storage devices for storing data. As an example, assume that multi-device file system software 120 has determined allocation pattern 210 that data should be allocated twice as often to storage device 140 as it is to either storage device 150 or 160. Using such an allocation pattern, according to some embodiment, multi-device file system software 120 may store data to storage device 140 twice in a row, then store data once to storage device 150 and then once to storage device 160 before returning to storage device 140. However, according to one embodiment, multi-device file system software 120 may, after writing data to storage device 140 just once, determine that the data for a specific storage request is non-critical and unlikely to be accessed frequently in the future, and therefore may store that data to storage device 150, rather than storage device 140. Multi-device file system software may store data to storage devices out of the order as specified by the allocation pattern if data characteristics for a storage request indicate that the data may correspond to the monitored performance characteristics of a particular storage device, for example. Thus, less critical and less frequently accessed data may be stored to poorer performing storage devices. Conversely, highly critical data with a high probability of frequent access may be stored to the best performing storage device even if the data would normally be written to a different storage device according to the allocation pattern.

In certain embodiments, file system software may be configured to monitor the difference in performance characteristics between the data reads and data writes for a single storage device and may modify data allocation based on those differences. For example, in one embodiment, a storage device may have faster write performance than read performance while another storage device may have faster reads than writes. In such an example, file system software 120 may allocate data expected to be read frequently to the storage device with faster reads even if that storage device may have slower overall access time than the storage device with faster writes. Additionally, in some embodiments, file system software 120 may determine that it is important to immediately store data even if that data are unlikely to be accessed frequently. In such an embodiment, the file system software may store such data to a storage device that exhibits fast write performance, but slower read performance. Conversely, in other embodiments, data may be written infrequently, such as from a data capture application, but that data may be read frequently. In such a situation, file system software 120 may store the data to a storage device that has slower write performance but faster read performance, according to one embodiment.

Multi-device file system software may determine data characteristics in a number of different ways, according to various embodiments. For example, file system software may be configured to use information in a storage request, such as the type of the requesting application, or the requesting application's security level, to help determine characteristics about the data associated with a storage request. Additionally, in another embodiment, multi-device file system software 120 may be configured to analyze the data itself to determine characteristics about the data, such as data size, that may be used in conjunction with an allocation pattern when selecting storage devices for writing the data. Alternatively, file system software may, in another embodiment, use system polices, such as one that specifies that data from certain application should always be considered to have high (or low) criticality, when determining data characteristics for a storage request.

Figure 9:
FIG. 9 is a flowchart illustrating a method, according to one embodiment, for a multi-device file system to modify an allocation pattern based on received input specifying performance characteristics for storage devices.

FIG. 9 is a flowchart illustrating a method, according to one embodiment, for a multi-device file system to modify an allocation pattern based on received input specifying performance characteristics for storage devices. In one embodiment, multi-device file system software may receive input specifying performance characteristics for one or more of the storage devices, as illustrated by block 900. For example, multi-device file system software 120 may receive, from a user or another process, information indicating performance characteristics for one or more storage devices. The input performance characteristics may, in some embodiment, may override currently monitored performance characteristics. In other embodiments, however, the input performance characteristics may not be able to be monitored otherwise. For instance, in one embodiment, a system administrator may input the expected end of life for storage devices. In another embodiment, the storage devices themselves may be configured to send information to file system software indication performance characteristics, such as current free space or capacity.

Additionally, multi-device file system software may, in one embodiment, modify the allocation pattern based on the received input, as illustrated by block 920. For example, multi-device file system software 120 may, in one embodiment, use the input performance characteristics to adjust or modify an allocation pattern, such as allocation pattern 210. For instance, multi-device file system software 120 may receive input indicating new performance characteristics for storage device 140 and may adjust or modify allocation pattern 210 to incorporate the received performance characteristics. Perhaps, a system administrator inputs performance characteristics that are not able to be monitored, such as end-of-life or that a storage device will be taken off-line soon, and multi-device file system software 120 may be configured to utilize such input characteristic to adjust allocation pattern 210 accordingly, in some embodiments.

FIG. 10 is a flowchart illustrating a method for replacing a determined data allocation pattern with an input allocation pattern, according to one embodiment. Multi-device file system software may, in one embodiment, receive input specifying a new allocation pattern for storage data to the plurality of storage devices, as illustrated by block 1000. For example, after determining an allocation pattern, such as allocation pattern 210, multi-device file system software 120, may receive input specifying a new allocation pattern. For instance, in one embodiment, multi-device file system software 210 may be configured to allow a system administrator to input a specific desired allocation pattern. Alternatively, in another embodiment, multi-device file system software 210 may be configured to receive a new allocation pattern from another process or device, such as a process configured to manage data allocation across multiple file systems or other load-balancing software. A new allocation pattern may be specified in various manners and methods, according to different embodiments. For instance, in one embodiment, multi-device file system software 120 may be configured to display a user interface allowing a system administrator to input a new allocation pattern. In another embodiment, however, multi-device file system software 120 may be configured to receive a message from another software process that includes information indicating a new allocation pattern.

Additionally, multi-device file system software may replace the determined allocation pattern with the new allocation pattern, as illustrated by block 1020 and according to one embodiment. For example, multi-device file system software 120 may, after receiving input specifying a new allocation pattern, replace an allocation pattern it determined previously with the newly received allocation pattern. In some embodiments, multi-device file system software 120 may be configured to use the newly received allocation pattern exclusively from then on, while in other embodiments, multi-device file system software 120 may start with the newly received allocation pattern, but may continue to monitor performance characteristics and adjust or modify the new allocation pattern based on future changes to the monitored performance characteristics of the storage devices. In certain embodiments, multi-device file system software 120 may be configured to allow an administrator or other user to specify whether or not it modifies or adjusts an input allocation pattern.

Figure 11:
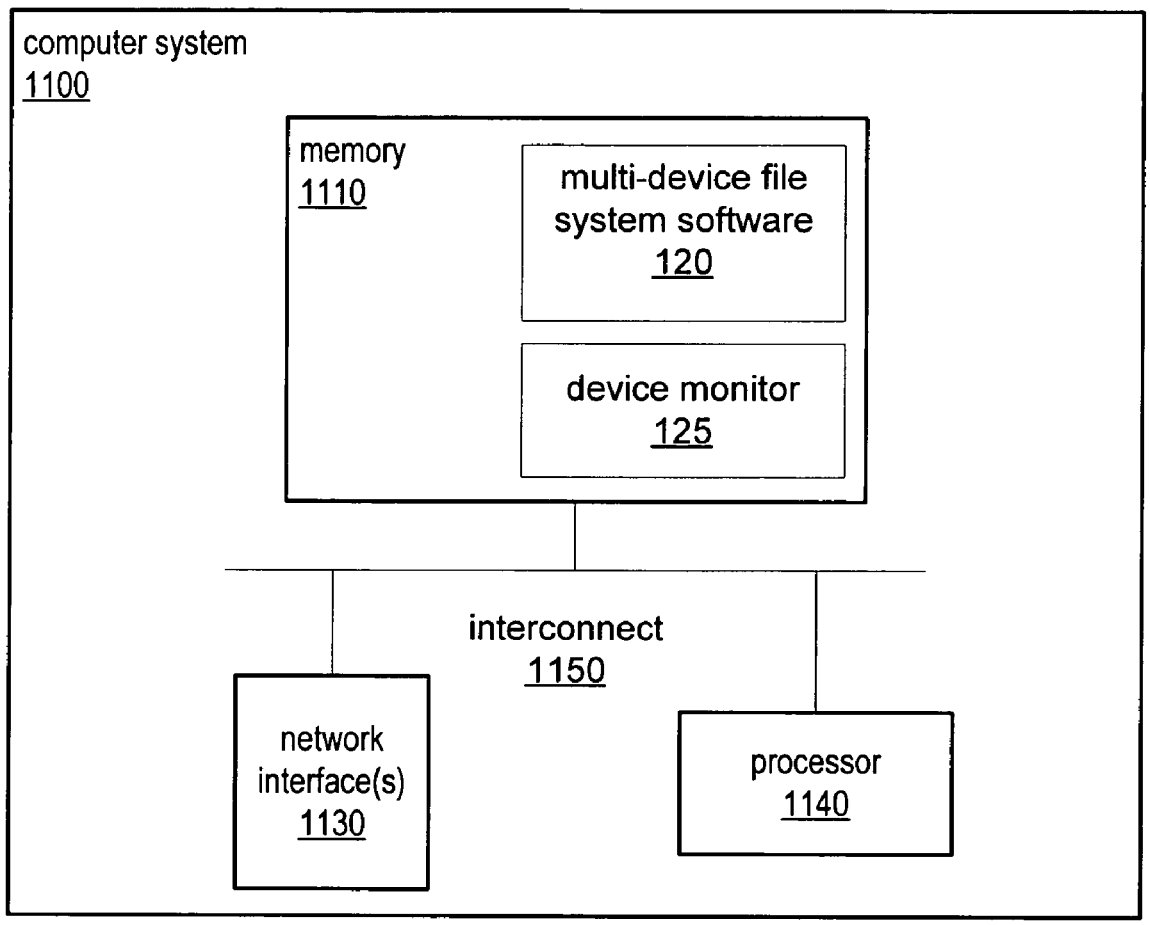
FIG. 11 is a block diagram illustrating a computer system suitable for implementing performance-adjusted data allocation, according to one embodiment.

FIG. 11 illustrates a computing system capable of implementing performance-adjusted data allocation as described herein and according to various embodiments. Computer system 900 may be any of various types of devices, including, but not limited to, a personal computer system, desktop computer, laptop or notebook computer, mainframe computer system, handheld computer, workstation, network computer, a consumer device such as a mobile phone, pager, or any type of networkable peripheral device such as storage devices, switches, modems, routers, etc, or in general any type of networkable computing device. Computer system 1100 may include at least one processor 1140. Processor 1140 may couple across interconnect 1150 to memory 1110 and network interface(s) 1130. Network interface(s) 1130 may be any of various types of interfaces configured to couple with and communicate over network 100 illustrated in FIG. 1 and described above.

Memory 1110 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

In some embodiments, memory 1110 may include program instructions configured to monitor performance characteristics of storage devices and apply performance-adjusted data allocation based on the monitored performance characteristics as described above. In certain embodiments memory 1110 may include program instructions configured to implement multi-device file system software, such as multi-device file system software 120. In one embodiment, multi-device file system software 120 may include program instructions configured to monitor performance characteristics of storage devices and apply performance-adjusted data allocation based on the monitored performance characteristics. In other embodiments, memory 1110 may include program instructions configured to implement a device monitor such as device monitor 125 illustrated in FIG. 1 and described above.

Although the embodiments above have been described in detail, numerous variations and modifications will become apparent once the above disclosure is fully appreciated. It is intended that the following claims be interpreted to embrace all such variations and modifications.

What is claimed is:
1. A method, comprising:
monitoring at a file system software level one or more performance characteristics for a plurality of storage devices virtualized by a multi-device file system software, wherein the multi-device file system software is configured to virtualize, for application access, data stored on the plurality of storage devices into a single, logical file system;

receiving a plurality of requests to store data in the file system;

determining, dependent on the one or more monitored performance characteristics an allocation pattern for storing data associated with the plurality of requests to store data in the file system, wherein the allocation pattern specifies a sequential order of the plurality of storage devices;

in response to said receiving, applying the allocation pattern at the file system software level to select one or more of the plurality of storage devices for storing the data associated with each of the requests, wherein the allocation pattern repeats after a given number of requests; and storing the data associated with the requests to the respective one or more selected storage devices as indicated by the allocation pattern.

2. The method of claim 1, wherein said monitoring comprises monitoring at the file system software level response times of the plurality of storage devices, and wherein the method further comprises:

changing the allocation pattern in response to changes in the response times of the plurality of storage devices.

3. The method of claim 1, further comprising:

determining a change in one or more of the monitored performance characteristics for one or more of the plurality of storage devices; and adjusting the allocation pattern based on the determined change in performance characteristics.

4. The method of claim 1, further comprising determining, prior to said selecting, data characteristics associated with the request, wherein said selecting is further dependent on the data characteristics associated with the request.

5. The method of claim 4, wherein the determined data characteristics comprise one or more of criticality, portability, future access probability, longevity, sharing, and metadata characteristics.

6. The method of claim 1, further comprising:

receiving input specifying performance characteristics for one or more of the plurality of storage devices; and modifying the allocation pattern based on the received input.

7. The method of claim 1, further comprising:

receiving input specifying a new allocation pattern for storing data to the plurality of storage devices; and replacing the determined allocation pattern with the new allocation pattern.

8. The method of claim 1, wherein the monitored performance characteristics comprise information regarding one or more of: access time, response time, failure rate, throughput, security, data redundancy characteristic, sharing characteristic, replication, anticipated device end-of-life, recovery status, and storage class.

9. The method of claim 1, wherein one or more of the plurality of the storage devices is a logical volume.

10. The method of claim 9, wherein the logical volume aggregates, for data availability and reliability, data on multiple storage devices and presents it to the file system as a single, integral virtual disk device.

11. A device, comprising:

a processor; and a memory coupled to the processor, wherein the memory comprises program instructions configured to implement a multi-device file system, wherein the multi-device file system is configured to:

monitor at a file system software level one or more performance characteristics for a plurality of storage devices of the multi-device file system, wherein the multi-device file system is further configured to virtualize, for application access, data stored on the plurality of storage devices into a single, logical file system;

receive a plurality of requests to store data in the file system;

determine, dependent on the one or more monitored performance characteristics, an allocation pattern for storing data associated with the plurality of requests to store data in the file system, wherein the allocation pattern specifies a sequential order of the plurality of storage devices;

in response to said receiving, applying the allocation pattern at the file system software level to select one or more of the plurality of storage devices for storing the data associated with each of the requests, wherein the allocation pattern is repeated after a given number of requests; and store the data associated with the requests to the respective one or more selected storage devices as indicated by the allocation pattern.

12. The device of claim 11, wherein as part of said monitoring the multi-device file system is further configured to monitor at the file system software level response times of the plurality of storage devices, and wherein the multi-device file system is further configured to:

change the allocation pattern in response to changes in the response times of the plurality of storage devices.

13. The device of claim 11, wherein the multi-device file system is further configured to:

determine a change in one or more of the monitored performance characteristics for one or more of the plurality of storage devices; and adjust the allocation pattern based on the determined change in performance characteristics.

14. The device of claim 11, wherein the multi-device file system is further configured to determine, prior to said selecting, data characteristics associated with the request, wherein said selecting is further dependent on the data characteristics associated with the request.

15. The device of claim 14, wherein the determined data characteristics comprise one or more of criticality, portability, future access probability, and metadata characteristics.

16. The device of claim 11, wherein the multi-device file system is further configured to:

receive input specifying performance characteristics for one or more of the plurality of storage devices; and modify the allocation pattern based on the received input.

17. The device of claim 11, wherein the multi-device file system is further configured to:

receive input specifying a new allocation pattern for storing data to the plurality of storage devices; and replace the determined allocation pattern with the new allocation pattern.

18. The device of claim 11, wherein one or more of the plurality of the storage devices is a logical volume.

19. The device of claim 18, wherein the logical volume aggregates, for data availability and reliability, data on multiple storage devices and presents it to the file system as a single, integral virtual disk device.

20. A data storage system, comprising:

a plurality of storage devices; and a multi-device file system host configured to virtualize, for application access, data stored on the plurality of storage devices into a single, logical file system; and wherein the multi-device file system host is further configured to:
- monitor at a file system software level one or more performance characteristics for the plurality of storage devices;
- receive a plurality of requests to store data in the file system;
- determine, dependent on the one or more monitored performance characteristics, an allocation pattern for storing data associated with the plurality of requests to store data in the file system, wherein the allocation pattern specifies a sequential order of the plurality of storage devices;
- in response to said receiving, apply the allocation pattern at the file system software level to select one or more of the plurality of storage devices for storing the data associated with each of the requests, wherein the allocation pattern is repeated after a given number of requests; and
- store the data associated with the requests to the respective one or more selected storage devices as indicated by the allocation pattern.

21. The data storage system of claim 20, wherein as part of said monitoring, the multi-device file system host is further configured to monitor at the file system software level response times of the plurality of storage devices, and wherein the multi-device file system is further configured to:
- change the allocation pattern in response to changes in the response times of the plurality of storage devices.

22. The data storage system of claim 20, wherein the multi-device file system host is further configured to:
- determine a change in one or more of the monitored performance characteristics for one or more of the plurality of storage devices; and
- adjust the allocation pattern based on the determined change.

23. A computer accessible medium, comprising program instructions configured to implement:
- monitoring one or more performance characteristics for a plurality of storage devices of a multi-device file system, wherein the multi-device file system is configured to virtualize data stored on the plurality of storage devices into a single, logical file system;
- receiving a plurality of requests to store data in the file system;
- determining, dependent on the one or more monitored performance characteristics, an allocation pattern for storing data associated with the plurality of requests to store data in the file system, wherein the allocation pattern specifies a sequential order of the plurality of storage devices;
- in response to said receiving, applying the allocation pattern to select one or more of the plurality of storage devices for storing the data associated with each of the requests, wherein the allocation pattern is repeated after a given number of requests; and
- storing data associated with the requests to the respective to one or more selected storage devices as indicated by the allocation pattern.

24. The computer accessible medium of claim 23, wherein as part of said monitoring, the program instructions are further configured to implement monitoring response times of the plurality of storage devices, and the program instructions are further configured to implement:
- changing the allocation pattern in response to changes in the response times of the plurality of storage devices.

25. The computer accessible medium of claim 23, wherein the program instructions are further configured to implement:
- determining a change in one or more of the monitored performance characteristics for one or more of the plurality of storage devices; and
- adjusting the allocation pattern based on the change in performance characteristics.

* * * * *